May 8, 1934.   H. M. RIDDLE   1,957,730

ALTIMETER

Original Filed June 8, 1932

Inventor

HARRY M. RIDDLE

By Mason Fenwick & Lawrence
Attorneys

Patented May 8, 1934

1,957,730

UNITED STATES PATENT OFFICE 1,957,730

ALTIMETER

Harry Maurice Riddle, Toledo, Ohio

Application June 8, 1932, Serial No. 616,108
Renewed March 27, 1934

3 Claims. (Cl. 73—4)

The invention forming the subject matter of this application is an improvement designed to convert an aneroid barometer into an altimeter giving indications of height above the ground at any desired location the height of which above sea level is known.

The main object of the invention is to provide a device of this character which can be readily applied to the mechanism of an aneroid barometer; and which can be adjusted so as to give a direct reading of the altitude of an aircraft relative to the ground.

Other objects of the invention will become apparent as the detailed description thereof proceeds.

Figure 1:
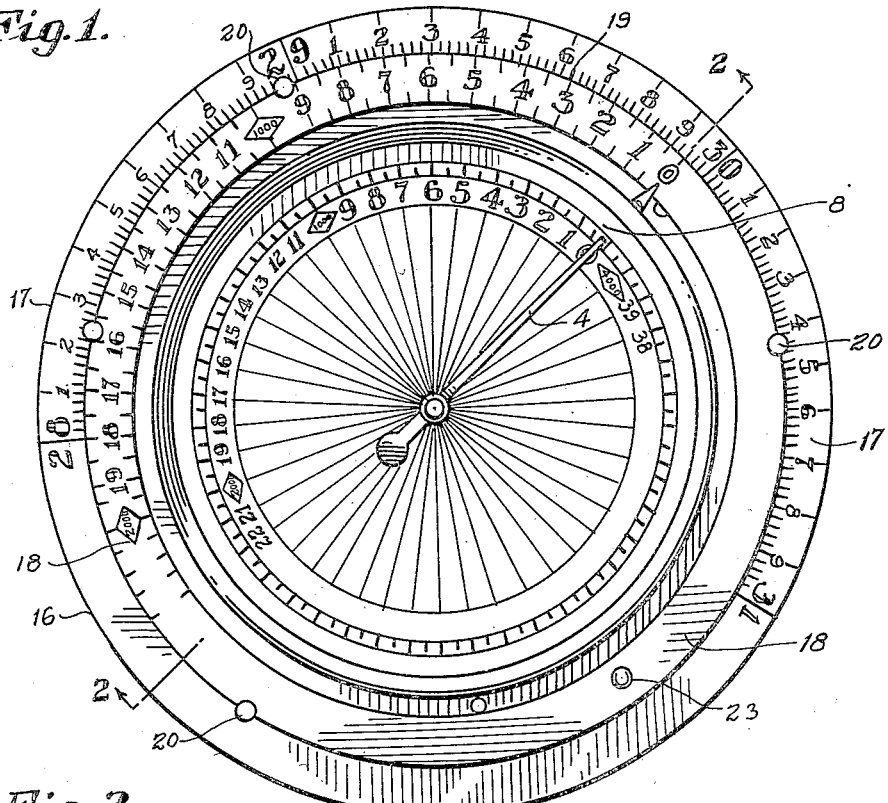
Figure 1 is a top plan view of an altimeter constituting the present invention.
Figure 2:
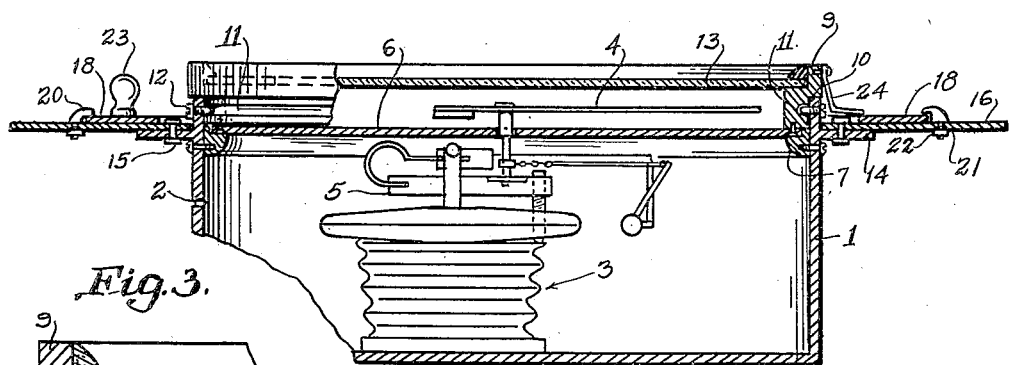
Figure 2 is a central vertical section taken on the line 2—2 of Figure 1.
Figure 3:
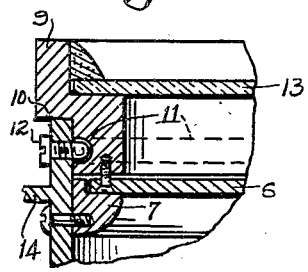
Figure 3 is a fragmentary detail to an enlarged scale illustrating the method of assembling the parts of this invention.

As shown in the drawing, the invention comprises a casing 1, provided with an air vent 2 and adapted to enclose the mechanism 3 of any suitable type of aneroid barometer. An indicator 4 is rotatably mounted on a bracket 5 extending transversely of and supported by the casing, said indicator being adapted to be rotated on the said bracket 5 by the movements of the mechanism 3 in accordance with changes in barometric pressure. The invention is not concerned with the specific details of this mechanism which is well known in the art.

The dial of the usual barometer is, in this case, replaced by a dial 6 rotatably mounted in a ring 7 suitably secured to the casing 1. The dial 6, rotatable about the axis of the indicator 4 as a center is provided with an altitude scale 8 which is calibrated to read in units of one hundred feet and sub-units of fifty feet, as shown in Figure 1 of the drawing. The scale 8 is shown as extending approximately through an arc of about 90° and may therefore be duplicated around the dial 6 so as to give readings up to about four thousand feet.

The dial 6 is secured to the bottom edge of a ring 9 rabbetted to seat in the cylindrical casing 1 and provided with a shoulder 10 adapted to ride on the upper edge of the said casing. The ring 9 is provided with an annular groove 11 adapted to receive the ends of screws 12 which cooperate with said groove to hold the ring 9 rotatably in position on the casing 1. The ring 9 may also be provided with a suitable rabbet to receive a transparent cover 13 for encasing the indicator 4.

The outer part of the casing, substantially in alignment with the dial 6, is provided with an annular plate 14 to which is connected, as by rivets 15, an annular scale plate 16. The scale plate 16 around its outer edge is provided with a scale 17 calibrated to indicate inches of mercury. The space between the scale 17 and the outer periphery of the casing 1 rotatably supports an annular scale plate 18 provided with a scale 19 similar in every respect to the scale 8 on the dial 6. This scale plate 18 is secured to rotate on the plate 16 about the axis of the indicator 4 by means of the inturned members 20 which have screwthreaded shanks 21 passing through apertures formed on the plate 16 and having clamping nuts 22 for holding said members 20 in proper position on the plate 16. The plate 18 is provided with a handle 23 to facilitate turning the said plate 18 on the plate 16. An indicator 24 is fixed to the ring 9 directly in alignment with the zero indication on the scale 8 so that the scale 8 may be set very accurately to register with any of the scale readings of the scale 19.

The scale 17 is the usual barometer scale and is fixed to the casing 1. For example, the graduation 30 of the scale 17 represents a pressure of thirty inches of mercury, which is the normal air pressure at sea level or zero altitude; the 29 graduation on the scale 17 would represent approximately one thousand feet as shown in Figure 1. The scale 19 provides a method of correcting the altimeter for the elevations of different air ports, and permits the pilot of an aircraft to set his instrument in known locations which may be invisible to him so that he may direct his craft to clear high buildings, hills and mountains. The dial 6 is settable by means of the ring 9 so as to cause the zero reading of scale 8 to register with the indicator 4 when the craft carrying the altimeter is at ground level, or zero altitude relative to the ground.

For convenience of illustration, the scales 17 and 19 are shown as supported outside the casing 1. It is to be understood, however, that the whole instrument may be enclosed and provided with any suitable transparent casing to protect the scales and at the same time rendered them visible for indicating purposes.

In the operation of this device, when an aircraft has arrived over an airport, which may be obscured from view by fog or other unfavorable weather conditions, the pilot can determine the location and elevation of the airport by consulting his airport bulletins and his maps. Since practically all mail and passenger lines carry radio equipment, the pilot can obtain the barometric pressure from the airport by radio. The scale plate 18 is then rotated on the plate 16 until the zero indication of the scale 19 corresponds to the sea level indication of the scale 17 at the particular barometric pressure transmitted to him from the airport.

The scale plate 18 is left in this adjusted position, and the pilot then rotates the dial 6 by means of the ring 9 until the indicator 24 is positioned opposite the graduation on the scale 19 corresponding to the elevation of the airport above sea level. For example, if the airport be 500 feet above sea level, the aeronaut rotates the dial until the indicator 24 registers with the indication 5 on the scale 19. When the dial 6 is adjusted as described, the zero indication of the scale 8 will be opposite the indication marked 5 on the scale 19. The indicator 4 then reads on the scale 8 in terms of elevation of the aircraft above the ground level of the airport. This means that if the indicator 4 were opposite the graduation 9 on the scale 8, the aircraft would be 900 feet above the ground level of the airport and would be 1400 feet above sea level.

With a supersensitive altimeter, the aeronaut in descending can note continuously the movement of the indicator 4 along the scale 8 and govern control of the aircraft so as to effect landing at the airport when the indicator 4 coincides with the zero graduation on the scale 8.

It will be apparent that the aircraft pilot may set his instrument so as to indicate the proper clearance for the craft in travelling on a course including high mountain ranges, hills, or buildings; and thereby, in continuously observing the movements of the indicator 4 over the scale, direct the craft to insure the passage at such height as to clear the obstructions.

While I have described my invention as embodied in concrete form and as operating in a specific manner, in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. An aneroid barometer including a casing, an indicator rotatably mounted on said casing, means for rotating the indicator in accordance with variations in atmospheric pressure, a scale calibrated in terms of atmospheric pressure and mounted concentrically with the axis of rotation of the indicator, a dial rotatable independently of said indicator on said casing, means for adjusting said dial on the casing, said dial having a scale thereon calibrated to read in terms of altitude above sea level corresponding to variations in atmospheric pressure, and an annular scale plate on said casing adjustable about said axis, and a pointer on said adjusting means movable over said annular scale plate, said annular plate being provided with a scale similar to the scale on the dial.

2. An altimeter comprising a support, a dial and an indicator mounted to rotate about a common axis on said support, means for rotating the indicator in accordance with variations in barometric pressure, means for rotating the dial around said axis independently of said indicator, said dial having a scale thereon calibrated in terms of altitude above sea level corresponding to differences in said pressure, a scale plate fixed to said support substantially coplanar with said dial and provided with a barometer scale, an annular plate mounted to rotate on said fixed plate and having a scale formed thereon similar to the scale on the dial, and an indicator fixed to the means for rotating the dial for movement over the scale formed on said annular plate.

3. An altimeter comprising a support, a dial rotatable on said support, an indicator mounted to rotate on said support, means for rotating the indicator in accordance with variations in barometric pressure, said dial having a scale thereon calibrated in terms of altitude corresponding to differences in such pressure, means for rotating said dial relative to said pointer, an annular scale plate mounted on said support, an annular plate mounted on said scale plate to rotate about the axis of said indicator, the scale plate being provided with the usual barometer scale and the annular plate being provided with a scale similar to the scale on the dial, and an indicator connected to the means for rotating the dial and in alignment with the zero indicator of the scale on said dial and movable over the scale on the annular plate.

HARRY MAURICE RIDDLE.